(12) United States Patent
Nageshrao et al.

(10) Patent No.: US 10,733,510 B2
(45) Date of Patent: Aug. 4, 2020

(54) VEHICLE ADAPTIVE LEARNING

(71) Applicant: Ford Global Technologies, LLC, Dearborn, MI (US)

(72) Inventors: Subramanya Nageshrao, Ann Arbor, MI (US); Hongtei Eric Tseng, Canton, MI (US); Dimitar Petrov Filev, Novi, MI (US); Ryan Lee Baker, Dearborn Heights, MI (US); Christopher Cruise, Farmington Hills, MI (US); Leda Daehler, Dearborn, MI (US); Shankar Mohan, Ann Arbor, MI (US); Arpan Kusari, East Lansing, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/111,550

(22) Filed: Aug. 24, 2018

(65) Prior Publication Data

US 2020/0065665 A1 Feb. 27, 2020

(51) Int. Cl.
*G06N 20/00* (2019.01)
*G06N 3/08* (2006.01)
(Continued)

(52) U.S. Cl.
CPC ............... *G06N 3/08* (2013.01); *B60W 30/10* (2013.01); *G06N 3/0454* (2013.01); *B60W 10/06* (2013.01);
(Continued)

(58) Field of Classification Search
CPC .. G05D 1/0221; G05D 1/0088; G05D 1/0214; G05D 1/0231; B60W 30/09;
(Continued)

(56) References Cited

U.S. PATENT DOCUMENTS 6,366,896 B1 4/2002 Hutchison
10,255,510 B2 * 4/2019 Yu ..................... G06K 9/00805
(Continued)

FOREIGN PATENT DOCUMENTS

CN 106910351 A 6/2017
CN 106990714 A 7/2017
(Continued)

OTHER PUBLICATIONS

He et al., "Reinforcement Learning Neural-Network-Based Controller for Nonlinear Discrete-Time Systems with Input Constraints", IEEE Transactions on Systems, Man, and Cybernetics, Part B, Cybernetics, vol. 37, No. 2, Apr. 2007.
(Continued)

*Primary Examiner* — Dalena Tran
(74) *Attorney, Agent, or Firm* — Frank A. MacKenzie; Bejin Bieneman PLC (57) ABSTRACT

A computing system can determine a vehicle action based on inputting vehicle sensor data to a first neural network including a first safety agent that can determine a probability of unsafe vehicle operation. The first neural network can be adapted, at a plurality of times, by a periodically retrained deep reinforcement learning agent that includes a second deep neural network including a second safety agent. A vehicle can be operated based on the vehicle action.

20 Claims, 7 Drawing Sheets

(51) Int. Cl.
*G06N 3/04* (2006.01)
*B60W 30/10* (2006.01)
*B60W 10/20* (2006.01)
*B60W 10/06* (2006.01)
*B60W 10/08* (2006.01)
*B60W 10/18* (2012.01)

(52) U.S. Cl.
CPC ............. *B60W 10/08* (2013.01); *B60W 10/18* (2013.01); *B60W 10/20* (2013.01); *B60W 2710/18* (2013.01); *B60W 2710/20* (2013.01)

(58) Field of Classification Search
CPC .... G01C 21/34; G06K 9/0079; G06N 99/005; G06N 3/08; G06N 20/00; G06N 5/022
USPC ...................... 701/44; 706/14–16, 18, 25–26
See application file for complete search history.

(56) References Cited

U.S. PATENT DOCUMENTS

2015/0100530 A1  4/2015  Mnih et al.
2017/0024643 A1  1/2017  Lillicrap et al.
2018/0011981 A1  1/2018  El Naga et al.
2019/0228309 A1* 7/2019  Yu ...................... G05B 13/0265
2019/0235515 A1* 8/2019  Shirvani ............. G05D 1/0088
2019/0266489 A1* 8/2019  Hu ........................ B60W 50/00

FOREIGN PATENT DOCUMENTS

CN  107506830 A  12/2017
WO  2017177128 A1  10/2017

OTHER PUBLICATIONS

Lee et al., "Lifelong Learning with Dynamically Expandable Networks", Aug. 11, 2017; arXiv:1708.01547v2.
Mnih, et al., "Human-level control through deep reinforcement learning", Nature 518.7540, 2015.
Ring, "Continual Learning in Reinforcement Environments", Dissertation, The University of Texas at Austin, Aug. 1994.
van Hasselt et al., "Deep Reinforcement Learning with Double Q-learning", Dec. 8, 2015, arXiv:1509.06461v3.

\* cited by examiner

VEHICLE ADAPTIVE LEARNING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine trajectories to be used to operate a vehicle in autonomous or semi-autonomous mode, for example, wherein the computing device can provide information to controllers to operate vehicle on a roadway in traffic including other vehicles. Based on sensor data, a computing device can determine a safe path for a vehicle to travel to reach a destination on a roadway in the presence of other vehicles and pedestrians, where a path is defined as a line connecting successive locations of a vehicle as it moves from a first location on a roadway to a second location on a roadway, and a safe path is defined as a path that keeps the vehicle within the roadway and does not include collisions with objects including other vehicles and pedestrians, for example. Determining a safe path can be improved by determining a safe path based on a neural network (NN), which can also be referred to as deep neural network (DNN) herein, and a safety agent (SA) and periodically updating the NN based on data acquired while operating the vehicle.

Disclosed herein is a method, including inputting vehicle sensor data to a first neural network (NN) that includes a first safety agent determining a probability of unsafe vehicle operation and is adapted, at a plurality of times, by a periodically retrained deep reinforcement learning agent that includes a second DNN including a second safety agent, and operating a vehicle based on a vehicle action output from the first NN. The vehicle action can include operation of vehicle steering, braking, and powertrain components. Vehicle sensor data can be input by inputting a color video image into the first NN. The first and second safety agents can determine probabilities of unsafe vehicle operation based on inputting vehicle actions into one of a rule-based machine learning system or a third NN, trained based on simulated data. The second NNs can be trained based on vehicle action ground truth, wherein vehicle action ground truth includes vehicle sensor data, vehicle actions, and information regarding unsafe vehicle operation from the safety agent.

The first and second NNs can be trained based on vehicle sensor data, vehicle actions, and information regarding unsafe vehicle operation from the safety agent that can be based on simulated data. The second NN, a reinforcement learning agent, can be periodically retrained based on recorded vehicle sensor data, recorded vehicle action ground truth, and recorded information regarding unsafe vehicle operation from the safety agent, subject to an error bound. The first NN can be adapted by retraining the first NN based on information from the periodically retrained second NN. The initial training of the first NN can be based on both safe buffer (state, safe action) pairs and unsafe buffer (state, unsafe action) pairs collected during offline simulation and training of the second NN is based on both safe buffer (state, safe action) pairs and unsafe buffer (state, unsafe action) collected during offline simulation and collected during driving. Operating a vehicle can be based on a vehicle action output from the first NN including determining a path polynomial based on the vehicle action output. The path polynomial can be based on an estimated 3D location of the vehicle with respect to a cognitive map. The vehicle location can be based on the path polynomial and the cognitive map. The vehicle sensor data can be a color video stream acquired by a video camera included in the vehicle. The vehicle can be operated by controlling vehicle steering, braking, and powertrain.

Further disclosed is a computer readable medium, storing program instructions for executing some or all of the above method steps. Further disclosed is a computer programmed for executing some or all of the above method steps, including a computer apparatus, programmed to input vehicle sensor data to a first neural network (NN) that includes a first safety agent determining a probability of unsafe vehicle operation and is adapted, at a plurality of times, by a periodically retrained deep reinforcement learning agent that includes a second NN including a second safety agent, and operating a vehicle based on a vehicle action output from the first NN. The vehicle action can include operation of vehicle steering, braking, and powertrain components. Vehicle sensor data can be input by inputting a color video image into the first NN. The first and second safety agents can determine probabilities of unsafe vehicle operation based on inputting vehicle actions into one of a rule-based machine learning system or a third NN, trained based on simulated data. The second NNs can be trained based on vehicle action ground truth, wherein vehicle action ground truth includes vehicle sensor data, vehicle actions, and information from the safety agent.

The computer apparatus can be further programmed to train first and second NNs based on vehicle sensor data, vehicle actions, and information from the safety agent based on simulated data. The deep reinforcement learning agent can be periodically retrained based on recorded vehicle sensor data, recorded vehicle action ground truth, and recorded information from the safety agent, subject to an error bound. The first NN can be adapted by retraining the first NN based on information from the periodically retrained second NN. The initial training of the first NN can be based on both safe buffer (state, safe action) pairs and unsafe buffer (state, unsafe action) pairs collected during offline simulation and training of the second NN is based on both safe buffer (state, safe action) pairs and unsafe buffer (state, unsafe action) collected during offline simulation and collected during driving. Operating a vehicle can be based on a vehicle action output from the DNN includes determining a path polynomial based on the vehicle action output. The path polynomial can be based on an estimated 3D location of the vehicle with respect to a cognitive map. The vehicle location can be based on the path polynomial and the cognitive map. The vehicle sensor data can be a color video stream acquired by a video camera included in the vehicle. The vehicle can be operated by controlling vehicle steering, braking, and powertrain.

Figure 1:
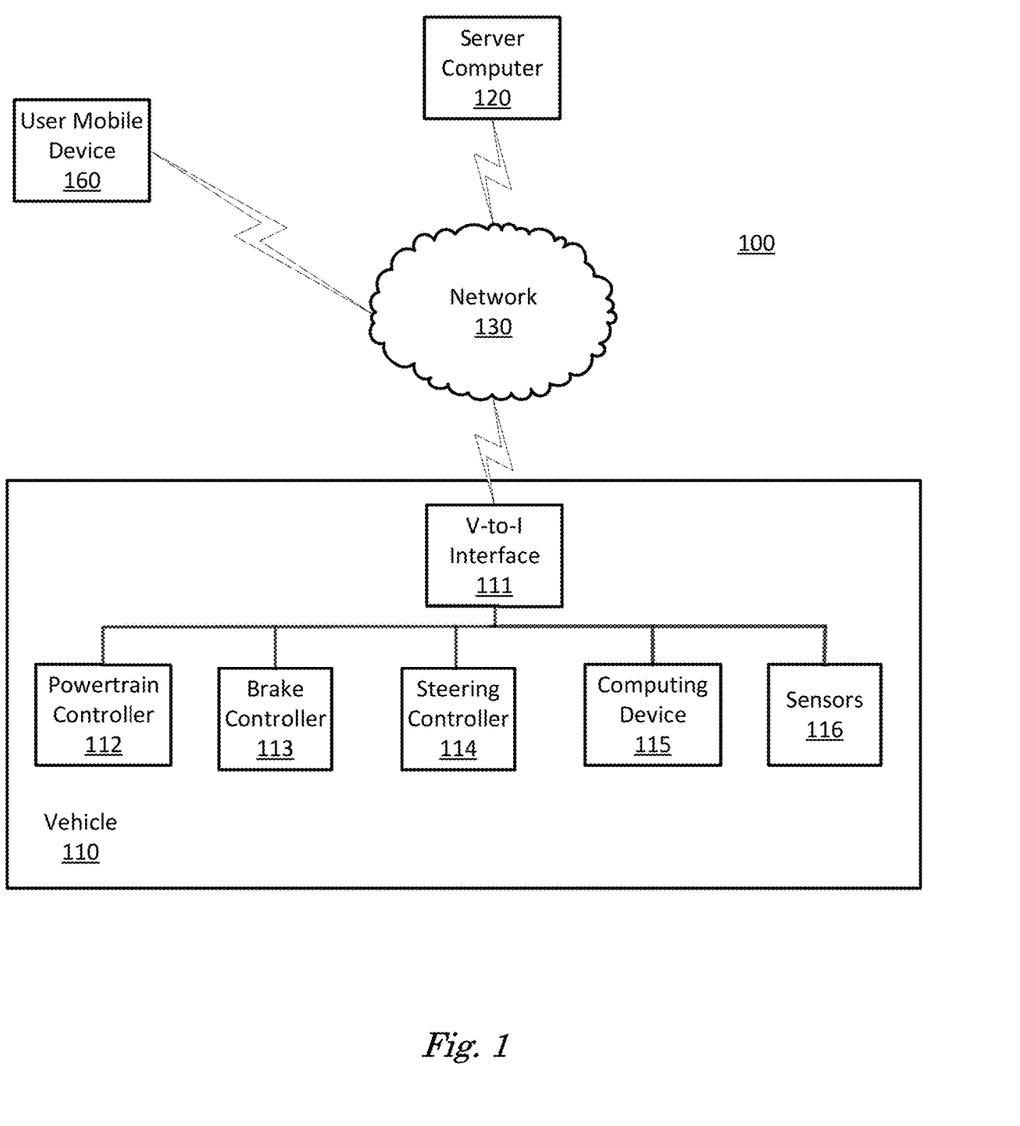
FIG. 1 is a block diagram of an example traffic infrastructure system.

FIG. 1 is a diagram of a traffic infrastructure system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
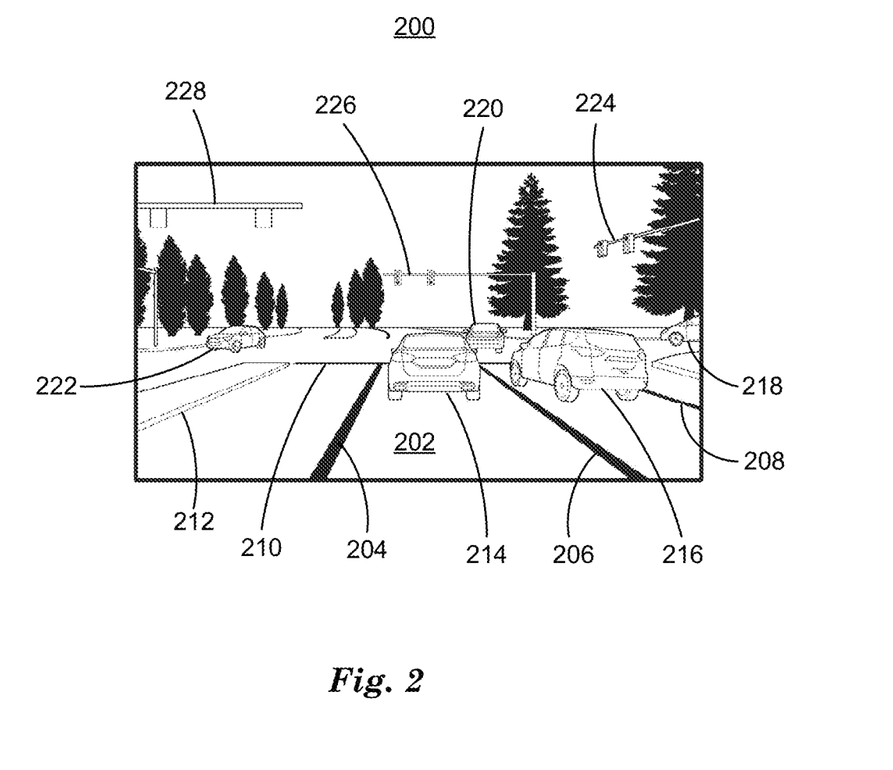
FIG. 2 is a diagram of an example video image of a traffic scene.

FIG. 2 is a diagram of an example color image 200 of a traffic scene, rendered in black and white to comply with 37 C.F.R. § 1.84(a)(1). Color image 200 can be acquired by sensors 116 including video sensors. Color image 200 can be input by computing device 115 and processed to yield information regarding the real world nearby vehicle 110 for use in operating vehicle 110. Using machine vision techniques including convolutional neural networks (CNNs), computing device 115 can locate and identify objects and regions in a field of view of a video sensor and use the objects and region to operate vehicle 110 safely.

A CNN for locating and identifying objects in color images 200 can include a plurality of convolutional layers interspersed with pooling layers followed by a plurality of convolutional layer interspersed with un-pooling layers to restore resolution using skip connections to convolutional layers while maintaining determined location and identity in intermediate data, wherein location is a pixel address (i,j) in color image 200 and identity is a label selected from a list of labels including "vehicle", "pedestrian", "roadway", lane marker", etc., and applied to connected regions of pixels by a trained CNN. A CNN can be trained to determine locations and identities for connected regions of pixels in a color image 200, a process called image segmentation, by training the CNN using recorded images and ground truth regarding the locations and identities of objects and regions in color image 200.

For example, in color image 200, computing device 115 can use a CNN to segment video image 200 to locate and identify a roadway 202, lane markers 204, 206, 208, stop marker 210, median 212, other vehicles 214, 216, 218, 2220, 222, and traffic signals 224, 226, 228 based on training a CNN using color images 200 and ground truth corresponding to the color images 200. Ground truth, as used herein, means information regarding the output from a CNN obtained from a source independent from the CNN. For example, a human can empirically locate and identify regions of a color image 200 corresponding to roadway 202, lane markers 204, 206, 208, stop marker 210, median 212, other vehicles 214, 216, 218, 2220, 222, and traffic signals 224, 226, 228. This information can be input to a CNN as ground truth to train the CNN by comparing the ground truth to CNN output and rewarding the CNN based on the similarity of the output to the ground truth.

A CNN can be trained based on simulated data. Simulated data is color image 200 data and corresponding ground truth from a near-realistic simulated environment generated and rendered by computer software as opposed to being acquired by a video sensor included in a vehicle 110 in a real-world environment and including ground truth based on the real-world environment. A near-realistic simulated environment in this context means a software program that can generate and render color images 200 that appear, to a viewer, as a real photograph of a real-world environment (photo-realistic), for example, a roadway with vehicles. For example, computer gaming software can render photo-realistic video scenes of vehicles, roadways and backgrounds based on mathematical and logical descriptions of objects and regions in the simulated environment. Computer software can generate and render simulated data of real-world traffic scenes including roadways, vehicles, pedestrians and backgrounds at a rate fast enough to produce far more color images 200 and corresponding ground truth data sets than could be acquired by video sensors on vehicles 110 acquiring data while vehicle 110 is operated on a roadway. The simulated traffic scenes can be selected to reproduce a plurality of roadway configurations, traffic, lighting and weather conditions likely to be found in real-world environments, for example. An example of a software program that can be used to produce simulated traffic scenes is TORCS, available at torcs.sourceforge.net as of the date of filing this application. Because the color images 200 included in the simulated data include information from a near-realistic simulated environment, CNN processes the color images 200 as if they included real data from a real-world environment.

Figure 3:
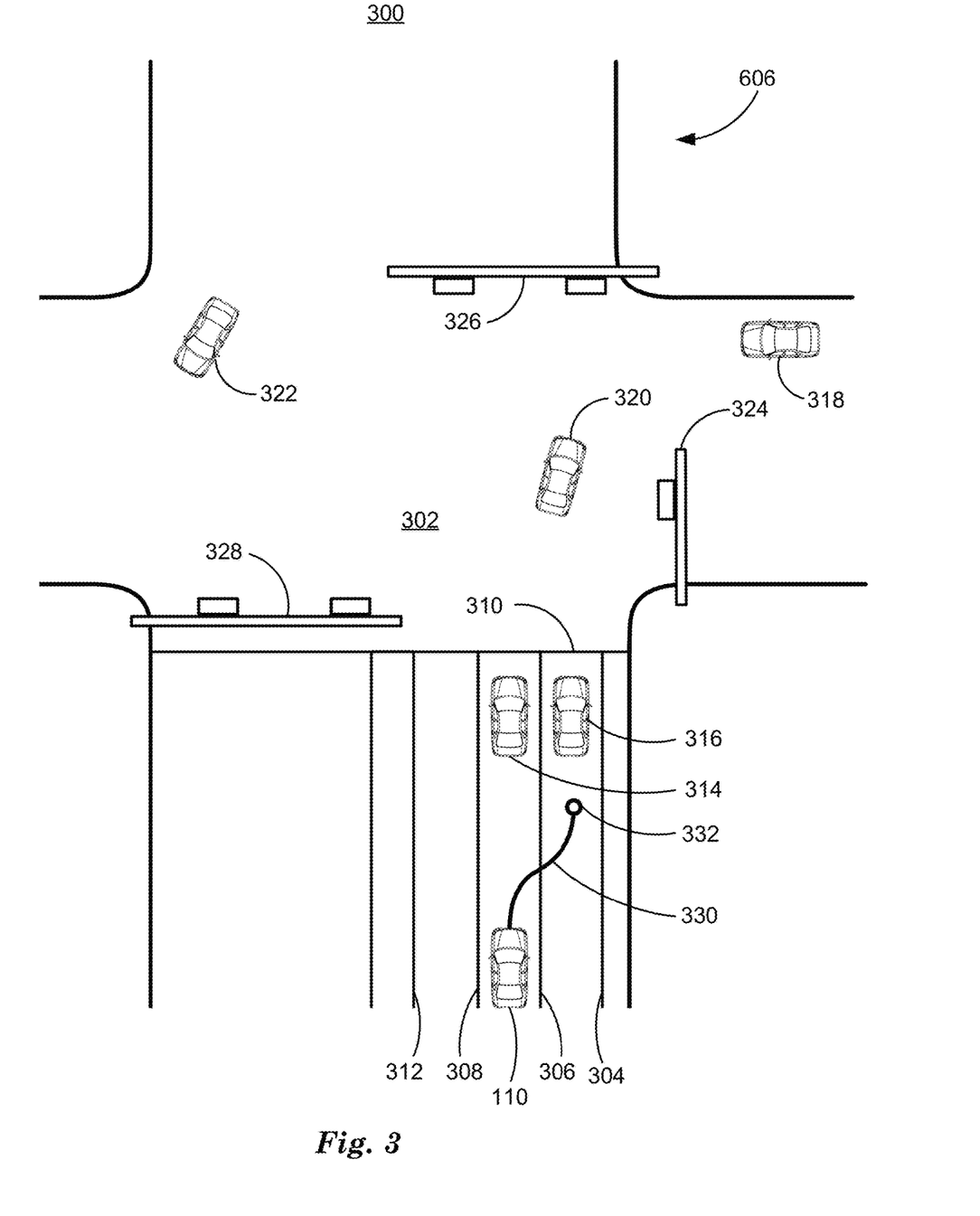
FIG. 3 is a diagram of an example cognitive map.

FIG. 3 is a diagram of an example cognitive map 300, generated by computing device 115 based on color image 200 and map data stored at computing device 115. A cognitive map is a map of the real world nearby a vehicle 110, rendered in top-down view. A cognitive map 300 is based on map data and vehicle 110 location data. Map data can be based on mapping software including GOOGLE™ maps downloaded from a server computer 120 based on a location of vehicle 110. Vehicle 110 location can be determined by computing device 115 based on sensors 116 including, e.g., GPS sensors and/or accelerometers. Vehicle 110 location with respect to cognitive map 300 can be improved by processing color image 200 with a CNN as described above to locate and identify connected regions of pixels corresponding to objects and regions in the field of view, and, project connected regions corresponding to located and identified objects and regions onto cognitive map 300 based on the real-world 3D pose of the field of view and the real-world 3D location of pixels in cognitive map 300, where real-world 3D location is the position of a point with respect to a real-world x, y, and z coordinate system like latitude, longitude and altitude and 3D pose is 3D location with respect to a real world coordinate system and rotations $\rho$, $\varphi$, and $\theta$ about the x, y, and z axes of the real-world 3D coordinate system.

Based on a field of view of a video sensor in real world coordinates and the location of an object or region with respect to the field of view, and determining, based on map data stored at computing device 115, the real-world 3D location of pixels in cognitive map 300, computing device can project objects and regions from color image 200 onto cognitive map 300. For example, roadway 202, lane markers 204, 206, 208, stop marker 210, median 212, other vehicles 214, 216, 218, 220, 222, and traffic signals 224, 226, 228 can be projected onto cognitive map to form roadway 302, lane markers 304, 306, 308, stop marker 310, median 312, other vehicles 314, 316, 318, 320, 322, and traffic signals 324, 326, 328. Projected objects and regions are combined with information regarding roadway 302, location of vehicle 110, and size and shape of objects and regions as they appear in cognitive map 300 in top-down view based on location and identity as discussed above. For example, computing device can predict or estimate the size, shape and 3D pose of other vehicles 314, 316, 318, 320, 322 in top down view based on information on size and shape and location in color image 200, video camera field of view 3D pose and stored information regarding roadway, and vehicle shape from a top-down view. The words predict and estimate will be used interchangeably herein.

Computing device 115 can operate vehicle 110 based on hierarchical layers of independent software programs that range from high level programs that determine high level tasks like "pick up occupant and transport to destination" or "return to service area" down through mid-level tasks like "turn right at next intersection" or "move to right lane" down to low-level tasks like "turn steering wheel a degrees, release brakes and apply b power for c seconds". Mid-level tasks can use cognitive maps information to form a path polynomial 330 based on a location of vehicle 110 and a second location, e.g., a location of an object such as another vehicle. The location can be determined by mapping software based on the location of vehicle 110 and a destination, in a similar fashion to step-by-step driving directions available with mapping software like GOOGLE™ maps, or by techniques described here in that can improve upon forming a path polynomial 330 by inputting state variables from processed color image 200 as described above that identify and locate a vehicle with respect to a roadway and nearby objects to a DNN block 400 and a safety agent block 508 (SA) included in a directed reinforcement learning (DRL) system 500 as discussed below in relation to FIGS. 4 and 5. DRL system 500 can output vehicle transition states that include a predicted 3D location 332 of vehicle 110. The predicted 3D location 332 can be input to software programs that can determine a path polynomial 330 based on limits on lateral and longitudinal accelerations and jerks (jerk being the first derivative of acceleration, i.e., the second derivative of speed). The output path polynomial 330 can be used by computing device 115 to operate vehicle 110 by controlling vehicle steering, brakes, and powertrain via controllers 112, 113, 114 to cause vehicle 110 to travel along path polynomial 330.

A path polynomial 330 is one or more polynomial functions of degree three or more that describe the predicted motion of a vehicle 110. Path polynomial 330 can be determined based on predicted behavior of vehicle 110 to forces generated by steering, brakes, and powertrain in reaction to commands received via controllers 112, 113, 114. In this fashion, computing device can determine the command to send to controllers 112, 113, 114 to cause vehicle 110 to operate along path polynomial 330 at determined lateral and longitudinal accelerations and jerks. For example, computing device 115 can send commands to controllers 112, 113, 114 based on path polynomial 330 to cause vehicle 110 to travel along path polynomial 330 and slow to a stop at second predicted 3D location 332.

Figure 4:
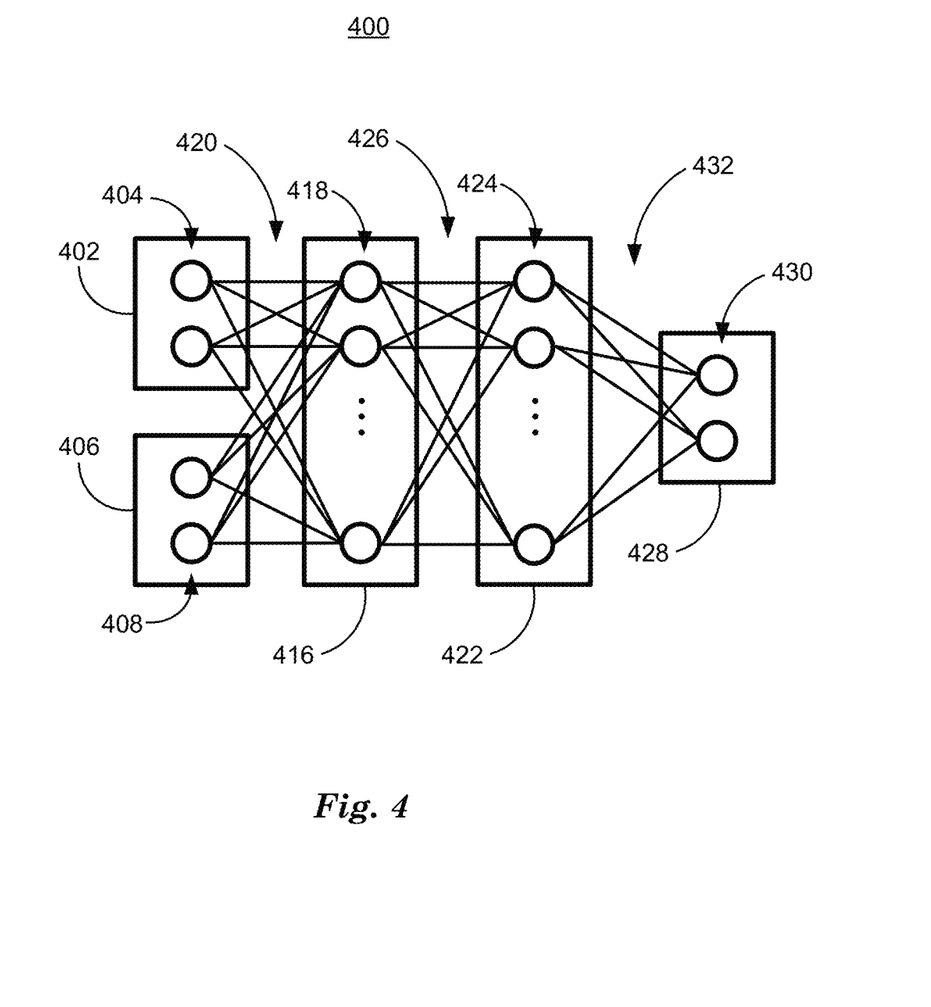
FIG. 4 is a diagram of an example deep neural network (DNN).

FIG. 4 is a diagram of an example DNN 400 that can calculate and output vehicle transition states 430 of output state layer 428 based on input vehicle states 404 of input state layer 402 and, during training, rewards 408 of rewards layer 406. DNN 400 includes hidden layers 416, 422 which respectively include nodes 418, 424 that are fully connected via interconnections 420, 426, 432 with input vehicle states 404, rewards 408 and output vehicle transition states 430. Interconnections 420, 426, 432 are means for transferring data to, from and between nodes 418, 428, where DNN 400 calculations occur. Each node 418 of hidden layer 416 can access all input vehicle states 404 and, during training, all rewards 408 for use in calculating intermediate states to be provided to nodes 424 of hidden layer 422 via interconnections 426. All nodes 424 of hidden layer 422 can access all intermediate states via interconnections 426 for use in calculating and transmitting output vehicle transition states 430 via interconnections 432 to output state layer 428. A vehicle transition state 430 is a set of data providing values describing a vehicle trajectory, e.g., a transition state can include predicted 3D pose, speed, and lateral and longitudinal acceleration data, and can be output to software programs to create a path polynomial 330 for operation of vehicle 110, for example.

All hidden layer 416, 422 calculations are parameterized to permit DNN 400 to learn to transform input vehicle states 404 into output vehicle transition states 430, where output vehicle transition states include a predicted 3D pose, speed and lateral and longitudinal acceleration data for vehicle 110 with respect to roadway 302. For example, input vehicle states 404 include values that describe location, speed and direction of a vehicle 110 with respect to a roadway 302 and other vehicles 314, 316, 318, 320, 322, and information on current vehicle travel directions, where current vehicle travel directions include instructions for completing a portion of a longer travel task, for example vehicle travel directions, "move to right lane", can be a portion of longer travel directions, "turn right at intersection in 100 ft.", which in turn can be part of a travel task, for example "travel from a first location along a route to a second location", etc. The vehicle directions can be determined by a software program like GOOGLE maps, running on server computer 120 and downloaded to computing device 115 via V-to-I interface 111, or determined by computing device 115 and stored at computing device 115.

Computing device 115 can input the output vehicle transition states 430 into software programs that can produce a path polynomial 330 to direct vehicle 110 operation from a current location to a second predicted 3D location 332 while maintaining limits on lateral and longitudinal accelerations and jerks, avoiding collisions or near collisions with other vehicles 314, 316, 318, 320, 322, and performing one or more steps towards accomplishing a current vehicle direction, for example "move to right lane to second predicted 3D location 332".

For example, using information based on the fields of view of each sensor 116, computing device 115 can estimate free space regions and non-free space regions included in cognitive map 300. Free space regions are regions of a cognitive map 300 in which a vehicle 110 can be predicted to travel unimpeded on a roadway surface. Computing device 115 can determine destinations in cognitive map 300 for vehicle 110 travel that will be a step in accomplishing a higher level goal-directed activity like picking up a passenger and dropping the passenger at a destination, for example. Non-free space regions included in a cognitive map 300 can include non-roadway regions and regions surrounding objects, both fixed objects like traffic cones and barriers, and, when objects are determined to be moving, locations to which the objects are likely to move, for example predicting travel for vehicles, pedestrians and cyclists. Locations in a cognitive map 300 to which the objects are likely to move can be determined based on repeated observations of the objects over time, for example, to determine object location probabilities based on determined object speed and direction. Path polynomials can be determined to direct vehicle 110 to travel within a free space region to reach a destination while avoiding non-free space regions.

Figure 5:
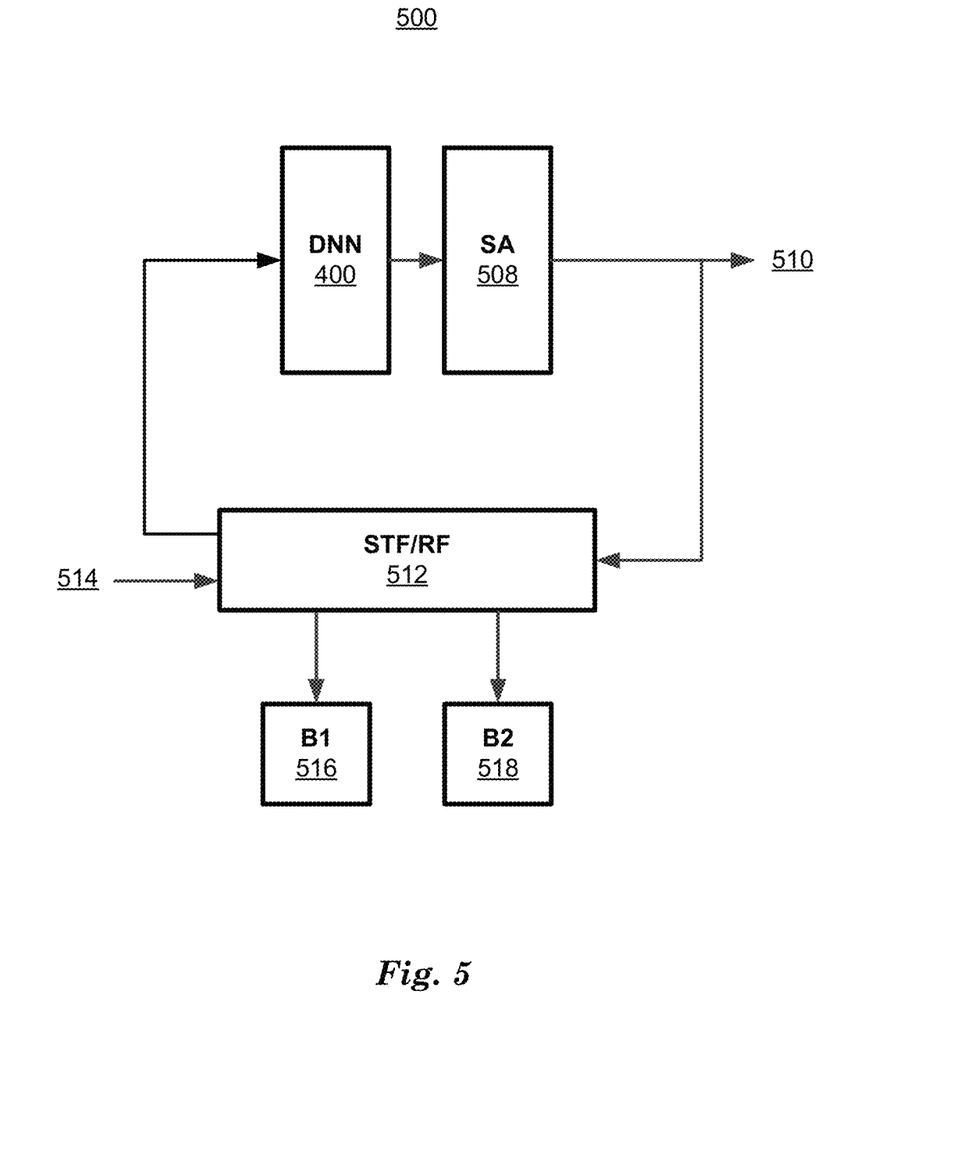
FIG. 5 is a diagram of an example deep reinforcement learning (DRL) system.

DNN 400 can be trained using input vehicle states 404 determined by a CNN that has been trained using video images 200 from a near realistic simulated environment as discussed above in relation to FIG. 2. It is unlikely that the simulated video images 200 can imitate the full range of complexities of operating a vehicle 110 in the real world. Techniques disclosed herein to improve training of a DNN block 400 to adapt to previously unseen color images 200 generating previously unseen input vehicle states by incorporating a DNN block 400 including a safety agent block 508 (SA) as part of a deep reinforcement learning (DRL) system 500 that includes the ability to be updated periodically with newly trained DRL system 500 from server computer 120 via V-to-I interface 111.

FIG. 5 is a diagram of an example deep reinforcement learning (DRL) system 500 that incorporates DNN 400 in a system that can be trained to output 510 vehicle transition states in response to input 514 vehicle state values in an improved fashion by determining safe operation of vehicle 110 using a safety agent block 508 (SA). DRL system 500 includes a safety agent 508 that inputs the predicted vehicle transition states output from DNN block 400 and evaluates them for safety violations using a short horizon safety check as discussed above and, in examples where the vehicle transition states correspond to safety violations, replace the vehicle transition states with termination vehicle states in output 510.

Techniques disclosed herein improve training of a DRL system 500 to adapt to input vehicle states produced in response to previously unseen video images 200, which require new output vehicle states, by incorporating a safety agent block 508 to check to output from DNN block 400.

A safety agent block 508 is a machine learning software program that can be either a rule-based software program, where a finite state machine analyze vehicle output states and determine safety violation probabilities according to user input rules and probabilities stored at computing device 115 for use by safety agent block 508, or safety agent block 508 can be a DNN software program, trained using safety violation probabilities provided by user input. In either case, safety agent block 508 can analyze vehicle transition states output by DNN block 400 to determine if a short-horizon safety violation is likely.

Short-horizon safety violations can include collisions and near-collisions with other vehicles or pedestrians, or vehicle 110 movement that would require another vehicle or pedestrian to stop or alter direction that would occur during the time frame represented by the operation of vehicle 110 to travel to a predicted 3D location, for example. Short horizon safety violations can be determined by safety agent block 508 by comparing the relationships between predicted 3D pose of vehicle 110 included in the vehicle transition states and cognitive map 300 including other vehicles 314, 316, 318, 320, 322, and/or the roadway to a list of rules and probabilities based on the relationships. For example, based on the 3D pose of other vehicles 314, 316, 318, 320, 322, determined with respect a predicted 3D location of vehicle 110, a probability that one or more of the other vehicles will move so as to interfere with vehicle 110 and thereby cause a collision or near-collision can be determined by accessing the list of rules. For example, where vehicle transition states indicate that vehicle 110 will perform a lane change as indicated by path polynomial 330, a lane change rule can require that a safety check be performed to determine whether the adjacent lane is clear of approaching traffic. Computing device 115 can perform a safety check based on processing data from sensors 116 including side- and rear-facing video cameras, for example. Based on data from side- and rear-facing video cameras, computing device 115 can determine a probability that a moving vehicle will occupy or closely approach a predicted 3D location 332 before or near in time to vehicle 110 and therefore the probability of a safety violation. A relationship between a predicted 3D pose of vehicle 110 and probabilities associated with safety violations, and therefore rules for a rule-based system, are determined by user input based on reviewing example vehicle transition states emitted by DNN block 400 and analyzing them with respect to cognitive map 300 to determine potential safety violations and assign probabilities based on location and predicted motion of other vehicles, for example.

For example, DNN block 400 directing vehicle 110 to travel to a predicted 3D location represented by path polynomial 330 in FIG. 3 can be regarded as having a high probability of a safety violation because performing the lane change maneuver can be considered a short-horizon safety violation absent safety check information regarding approaching traffic in the adjacent lane prior to operating vehicle 110 to perform the maneuver. In the event that safety agent block 508 determines no short-horizon safety violation will occur based on safety check information included in input vehicle states regarding adjacent lane traffic or based on previously processed safety check information stored at safety agent block 508 regarding adjacent lane traffic, safety agent block 508 can output 510 the output vehicle states unchanged and send a copy to state transition function/reward function block 512. In the event that safety agent block 508 determines that a moderate to high probability (>50%) of a short-horizon safety violation is associated with the vehicle transition states based on the predicted 3D pose of the vehicle by a rule included in the rule-based system, safety agent block 508 can substitute termination output vehicle states for the vehicle states output by DNN block 400. Termination output vehicle states can direct vehicle 110 to operate to avoid the short horizon safety violation, where the termination vehicle states can depend upon the vehicle states output from DNN block 400, including immediately slowing to a stop in lane or immediately reversing a maneuver, for example reversing a lane change maneuver to return to a starting lane, etc.

Safety agent block 508 can also be implemented by a safety agent DNN, where inputs include vehicle transition states output by DNN 400 that are input to the safety agent DNN. A safety agent DNN can be trained based on recorded sets of vehicle transition states and corresponding ground truth. In this case the ground truth includes empirically determined probabilities of short-horizon safety violations based on examination of the vehicle transition states and corresponding cognitive maps 300. Safety agent DNN can be trained to output either "no violation" and the original vehicle transition states or "violation" and termination states based on input vehicle transition states.

Safety agent block 508 also passes information regarding safety violations, vehicle transition states and termination states vehicle states to state transition function/reward function block 512 (STF/RF). During training, state transition function/reward function block 512 inputs an input 514 vehicle state and determines an error function e based on the predicted vehicle transition states from safety agent block 508 and ground truth represented by the input 514 vehicle state. In this example the input 514 vehicle state represents a next observation of a function being learned by DRL system 500. DRL system 500 can learn a function like transforming input 514 vehicle states into output 510 vehicle transition states by determining an error function ε that is based on a value function $V(s_t,a_t)$ where $s_t$ is vehicle state at time t and $a_t$ is vehicle transition state at time t, and error function ε can be the equation:

$$\varepsilon = V(s_{t+1}, a_{t+1}) - V(s_t, a_t) \quad (1)$$

Temporal difference learning and therefore deep reinforcement learning (DRL) systems can be represented by the equation:

$$V(s_t, a_t) \leftarrow V(s_t, a_t) + \alpha(\varepsilon) \quad (2)$$

where an empirically determined constant α (0-1) called the learning constant determines the percentage of the difference in value between a state and a next observation of the state at time t+1 that can be added to the value equation $V(s_t,a_t)$ to increase the probability that training will converge on a correct solution represented by minimizing error function e over the solution space for all $(s_t,a_t)$. The solution space for all $(s_t,a_t)$ can be represented by samples at densities appropriate to provide tractable data volumes and rates.

Determining error function e also includes determining a reward function to input to DNN block 400 during training to determine correct output vehicle transition states in response to input vehicle states. During training, DNN block 400 can determine output vehicle states by exploration, where output vehicle states are determined from a sampled solution space for all $(s_t,a_t)$. In this fashion, a representative sample of all possible output vehicle states can be evaluated by state transition function/reward function block 512 to determine the $(s_t,a_t)$ states having the lowest error function ε.

During operation of DRL system 500, observations of vehicle states are input 514 to DNN block 400 via state transition function/reward function block 512. DNN block 400 determines output vehicle transition states based on previously trained lowest error function ε to output to safety agent 508, which determines whether the output vehicle state represent a safety violation and outputs 510 either vehicle transition states or vehicle termination states. Safety agent block 508 also sends output vehicle transition states, vehicle termination states and information on safety violations to state transition function/reward function block 512. During operation, error function ε is determined based on output vehicle transition states and next observation vehicle states input 514, and, based on error function ε exceeding an empirically determined minimum threshold, computing device 115 can store the output vehicle states in storage buffers B1 516 or B2 518 depending upon whether the output vehicle states represent a safety violation. Requiring the error function ε to exceed an empirically determined threshold can ensure the sufficient persistence of excitation of a new observation.

State transition function/reward function block 512 can store output vehicle states, error function ε, and rewards based on safety violation information. In examples where no safety violation has occurred, input vehicle stated, output vehicle transition states, error function ε, and a reward based on error function ε and no safety violation (safe action) can be stored at buffer B1 516. In examples where a safety violation has been determined by safety agent block 508, input vehicle states, output vehicle termination states, error function ε, and a reward determined based on error function ε and the safety violation (unsafe action) can be stored at buffer B2 518. The contents of buffers B1 516 and B2 518 can be periodically uploaded to server computer 120 via V-to-I network 111 by computing device 115. Once uploaded, server computer 120 can re-train a DRL system 500 that is a copy of the trained DRL system 500 in vehicle 110 with the uploaded data using a stochastic gradient search method that finds local maxima and minima in solution space. Data from the re-trained DRL system 500 can be downloaded to vehicle 110 and used to upgrade the DRL system 500 included in vehicle 110.

In practice server computer 120 typically communicates with a plurality of autonomous and semi-autonomous vehicles 110, each vehicle 110 acquiring buffers B1 516 and B2 518 full of data and each vehicle 110 periodically uploading buffers of data to server computer 120, where server computer 120 re-trains a DRL system 500 based on the uploaded data. Server computer can periodically download re-trained versions of DRL system 500 to vehicles 110, thus continuously improving the ability of DRL system 500 to output vehicle states corresponding to safe operation of vehicle 110. Centralizing computation at server computer 120 can reduce the computational complexity required at computing devices 115 in vehicles 110.

Figure 6:
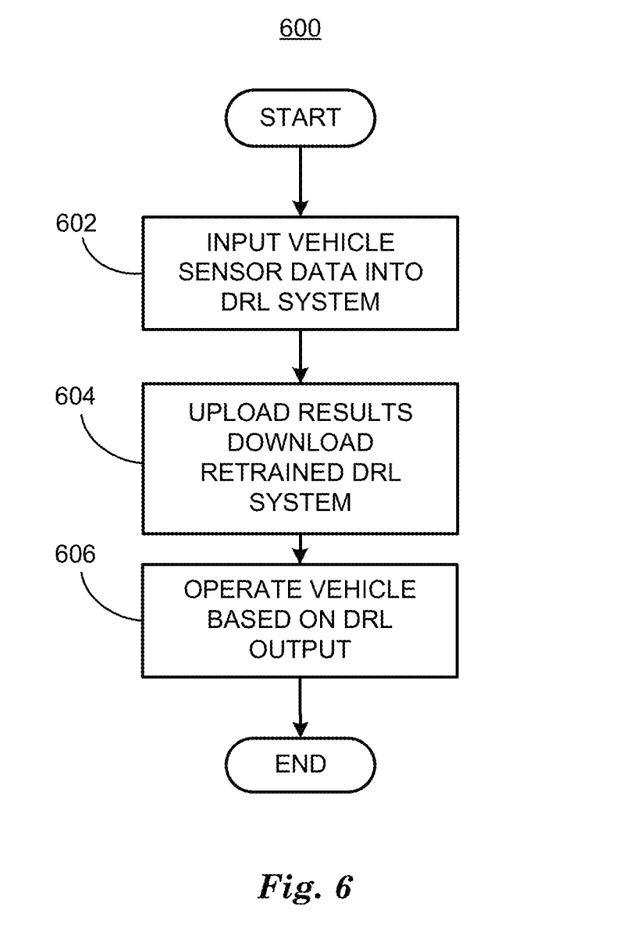
FIG. 6 is a flowchart diagram of an example process to operate a vehicle based on a video image.

FIG. 6 is a diagram of a flowchart, described in relation to FIGS. 1-5, of a process 600 for operating a vehicle based on inputting vehicle sensor data to a DRL system 500, where DRL system 500 includes a DNN block 400 and a safety agent block 508. Process 600 can be implemented by a processor of computing device 115, taking as input information from sensors 116, and executing commands and sending control signals via controllers 112, 113, 114, for example. Process 600 includes multiple blocks taken in the disclosed order. Process 600 also includes implementations including fewer blocks or can include the blocks taken in different orders.

Process 600 begins at block 602, in which a computing device 115 included in a vehicle 110 can input vehicle sensor data into a DRL system 500. Vehicle sensor data can be color video data acquired by a color video sensor included in vehicle 110 and processed by a CNN and data from other sensors 116 such as radar sensor and lidar sensors, to determine observations of vehicle states to input to DRL system 500. Vehicle states can include location, speed and direction of vehicle 110 with respect to map data and distance and directions to vehicles and pedestrians, for example, as discussed above in relation to FIGS. 4 and 5.

At block 604, DNN block 400 of DRL 500 determines output vehicle states to input to safety agent block 508 of DRL 500. Safety agent block 508 determines whether the output vehicle states are a safety violation based on empirically determined rules. When output vehicle states represent a safety violation, termination vehicle states are output 510 instead of the output vehicle states to ensure safe operation of vehicle 110. During operation, DRL 500 stores results including safety violations in either buffers B1 516 or B2 518, depending upon safety violations. Data in buffers B1 516 and B2 518 is periodically uploaded to server computer 120, where a copy of DRL system 500 is re-trained based on the uploaded data. Copies of the re-trained DRL system 500 can be downloaded periodically to vehicles 110 to update DRL system 500.

Output vehicle states can be output 510 to computing device 115 to use in operating vehicle 110. Computing device 115 can input the output vehicle states to control theoretic programs that can determine path polynomials 330 to operate vehicle 110 along to a predicted 3D location 332. Computing device 115 can send commands to controllers 112, 113, 114 to operate vehicle steering, brakes and powertrain to operate vehicle along path polynomial 330 with determined lateral and longitudinal accelerations. Following this step process 600 ends.

Figure 7:
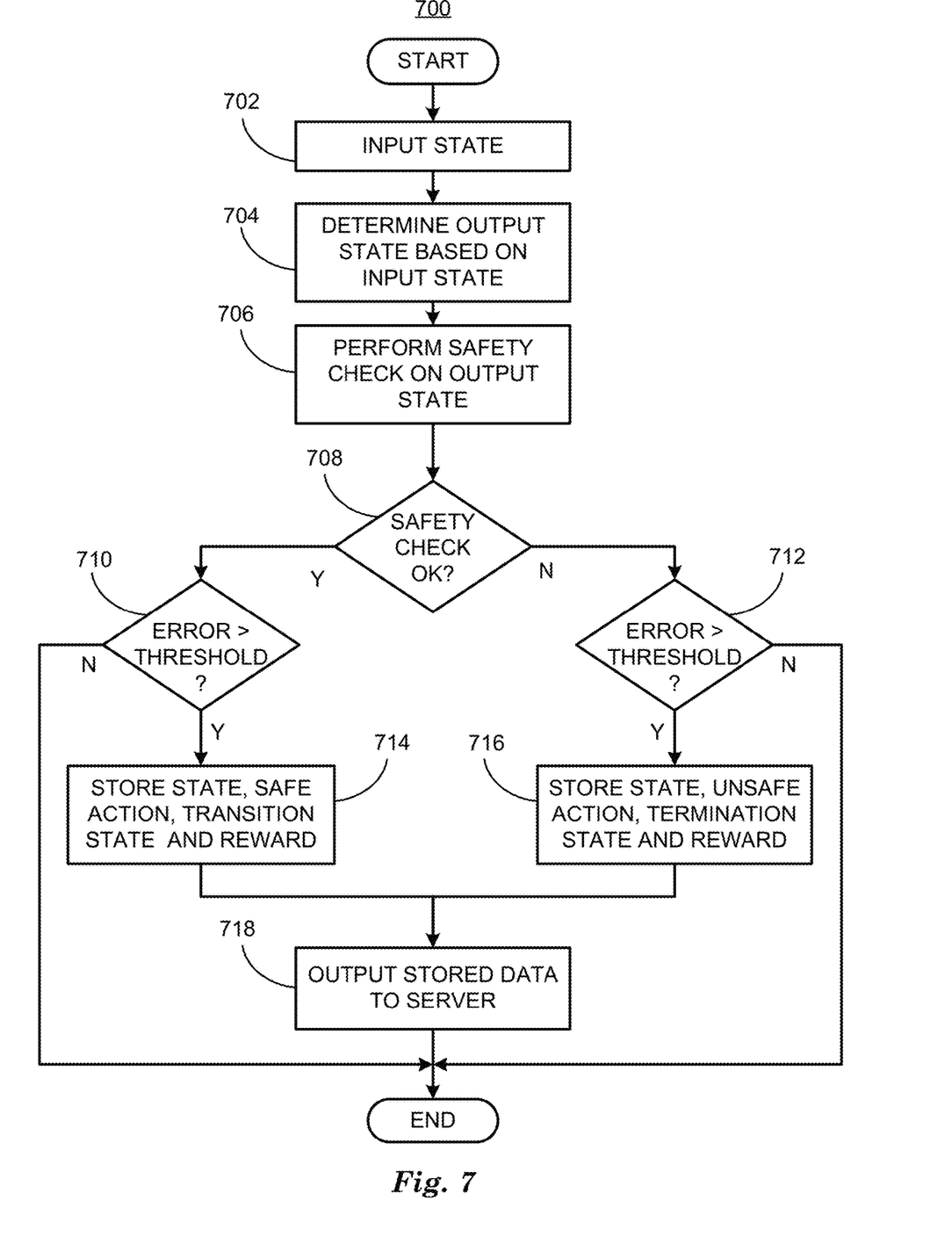
FIG. 7 is a flowchart diagram of an example process to determine vehicle states based on a DRL system.

FIG. 7 is a diagram of a flowchart, described in relation to FIGS. 1-5, of a process 700 for determining vehicle output states based on inputting vehicle sensor data to a DRL system 500, where DRL system 500 includes a DNN block 400 and a safety agent block 508. Process 700 can be implemented by a processor of computing device 115, taking as input information from sensors 116, and executing commands and sending control signals via controllers 112, 113, 114, for example. Process 700 includes multiple blocks taken in the disclosed order. Process 700 also includes implementations including fewer blocks or can include the blocks taken in different orders.

Process 700 begins at block 702, in which a computing device 115 included in a vehicle 110 can input vehicle sensor data into a CNN to determine vehicle state information, including vehicle location, speed and direction with regard to map data, along with information regarding distance and direction to vehicles and pedestrians in a field of view of vehicle sensors, and inputs the vehicle state data to a DRL system 500.

At block 704 of process 700, DNN block 400 of DRL system 500 determines output vehicle states based on the input vehicle states as discussed above in relation to FIG. 5 and outputs the output vehicle states to be input at safety agent block 508.

At block 706 of process 700, safety agent block 508 determines whether or not output vehicle transition states represent a safety violation. Safety agent block 508 can be a rule-based machine learning software program that determines safety violations by comparing the vehicle transition states to empirically determined states encoded as rules in a rule-based machine learning software, where rules can be based on empirically determined probabilities related to movement and future positions of other vehicles 314, 316, 318, 320, 322, for example. Vehicle transition states which, when acted upon by computing device 115 to operate vehicle 110 can be predicted to position vehicle 110 within a region in cognitive map 300 determined to have a probability of being occupied by at least one of other vehicles 314, 316, 318, 320, 322 greater than an empirically determined threshold can be determined to be a safety violation, for example. Safety agent block 508 can also be implemented as a DNN, wherein the DNN is trained based on input vehicle states empirically determined to include presence or absence of safety violations as ground truth.

At block 708 of process 700 branches depending upon the result of safety agent block 508 performing a safety check on vehicle transition states at block 706. Process 700 branches to block 710 if there is no safety violation and branches to block 712 if there is a safety violation.

At block 710 safety agent 508 outputs 510 vehicle transition states determined to include no safety violations to computing device 115 to use to determine a path polynomial 330 for vehicle 110 operation. Safety agent 508 outputs safety violation information and vehicle transition states to transition function/reward function block 512 to determine an error function ε based on the vehicle transition function and an input 514 next observation of vehicle states. If the error function ε is greater than or equal to an empirically determined threshold, process 700 passes to block 714. If the error function ε is less than the empirically determined threshold, process 700 ends.

At block 712 safety agent 508 outputs 510 vehicle termination states to avoid outputting vehicle transition states having a high probability of including a short-horizon safety violation to computing device 115 to use to determine a path polynomial 330 for vehicle 110 operation. Safety agent 508 outputs safety violation information and vehicle transition states to transition function/reward function block 512 to determine an error function ε based on the vehicle transition function and an input 514 next observation of vehicle states. If the error function ε is greater than or equal to an empirically determined threshold, process 700 passes to block 716. If the error function ε is less than the empirically determined threshold, process 700 ends.

At block 714 process 700 stores vehicle transition state, safety violation information (safe action) and a reward function determined based on the error function ε in buffer B1 516. Process 700 then passes to block 718.

At block 716 process 700 stores vehicle transition state, safety violation information (unsafe action) and a reward function determined based on the error function ε in buffer B2 518. Process 700 then passes to block 718.

At block 718 process 700 periodically uploads buffers B1 518 and B2 516 to a server computer 120, wherein server computer 120 re-trains a copy of DRL system 500 based on the uploaded buffers. Server computer 120 periodically downloads a re-trained copy of DRL system 500 to vehicle 110 to update DRL system 500. Following block 718 process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
    inputting vehicle sensor data to a first neural network (NN) that outputs vehicle transition states that include a predicted 3D pose, speed, and lateral and longitudinal acceleration data;
        wherein the NN includes a safety agent that based on the transition states, determines a probability of unsafe vehicle operation and is adapted, at a plurality of times, by a periodically retrained deep reinforcement learning agent that includes a second NN including a second safety agent,
        wherein the second NN and second safety agent receive as input at least some of the transition states, information about safety violations that include a collision or near collision, and one or more termination states that have been substituted for one or more of the transition states, and
        wherein a termination state includes a vehicle operation to avoid safety violations; and
    operating a vehicle based on a vehicle action output from the first NN.

2. The method of claim 1, wherein the vehicle action includes operation of vehicle steering, braking, and powertrain components.

3. The method of claim 1, further comprising inputting vehicle sensor data by inputting a color video image into the first NN.

4. The method of claim 1, wherein the safety agent determines probabilities of unsafe vehicle operation based on inputting vehicle actions into one of a rule-based machine learning system or a third NN, trained based on simulated data.

5. The method of claim 1, wherein the second NN is trained based on vehicle action ground truth, wherein vehicle action ground truth includes vehicle sensor data, vehicle actions, and information regarding unsafe vehicle operation from the safety agent.

6. The method of claim 5, wherein the vehicle sensor data, vehicle actions, and information from the safety agent is based on simulated data.

7. The method of claim 1, further comprising periodically retraining the second NN, a reinforcement learning agent, based on recorded vehicle sensor data, recorded vehicle action ground truth, and recorded information regarding unsafe vehicle operation from the safety agent, subject to an error bound.

8. The method of claim 7, further comprising adapting, at a plurality of times, the first NN by updating first NN parameters with parameters from the second NN.

9. The method of claim 1, where the initial training of first NN is based on both safe buffer (state, safe action) pairs and unsafe buffer (state, unsafe action) pairs collected during offline simulation and training of the second NN is based on both safe buffer (state, safe action) pairs and unsafe buffer (state, unsafe action) collected during offline simulation and collected during driving.

10. A system, comprising a processor; and
    a memory, the memory including instructions to be executed by the processor to:

input vehicle sensor data to a first neural network (NN) that outputs vehicle transition states that include a predicted 3D pose, speed, and lateral and longitudinal acceleration data;
    wherein the NN includes a safety agent that based on the transition states, determines a probability of unsafe vehicle operation and is adapted, at a plurality of times, by a periodically retrained deep reinforcement learning agent that includes a second NN including a second safety agent,
    wherein the second NN and second safety agent receive as input at least some of the transition states, information about safety violations that include a collision or near collision, and one or more termination states that have been substituted for one or more of the transition states, and
    wherein a termination state includes a vehicle operation to avoid safety violations; and
and
    operate a vehicle based on the vehicle action output from the first NN.

11. The system of claim 10, wherein the vehicle action includes operation of vehicle steering, braking, and powertrain components.

12. The system of claim 10, further comprising inputting vehicle sensor data by inputting a color video image into the first deep neural network.

13. The system of claim 10, wherein the safety agent determines probabilities of unsafe vehicle operations based on inputting vehicle actions into one of a rule-based machine learning system or a third NN, trained based on simulated data.

14. The system of claim 10, wherein the second NN is trained based on vehicle action ground truth, wherein vehicle action ground truth includes vehicle sensor data, vehicle actions, and information regarding unsafe vehicle operation from the safety agent.

15. The system of claim 14, wherein the vehicle sensor data, vehicle actions, and information regarding unsafe vehicle operations from the safety agent is based on simulated data.

16. The system of claim 10, further comprising periodically retraining the second NN, deep reinforcement learning agent, based on recorded vehicle sensor data, recorded vehicle action ground truth, and recorded information regarding unsafe vehicle operation from the safety agent, subject to an error bound.

17. The system of claim 16, further comprising adapting, at a plurality of times, the first NN by updating first NN parameters with parameters from the second NN.

18. The system of claim 10 where the initial training of first NN is based on both safe buffer (state, safe action) pairs and unsafe buffer (state, unsafe action) pairs collected during offline simulation and training of the second NN is based on both safe buffer (state, safe action) pairs and unsafe buffer (state, unsafe action) collected during offline simulation and collected during driving.

19. A system, comprising:
means for controlling vehicle steering, braking and powertrain; and
means for:
    inputting vehicle sensor data to a first neural network (NN) including a first safety agent that outputs vehicle transition states that include a predicted 3D pose, speed, and lateral and longitudinal acceleration data;
    wherein the NN includes a safety agent that based on the transition states, determines a probability of unsafe vehicle operation and is adapted, at a plurality of times, by a periodically retrained deep reinforcement learning agent that includes a second NN including a second safety agent,
    wherein the second NN and second safety agent receive as input at least some of the transition states, information about safety violations that include a collision or near collision, and one or more termination states that have been substituted for one or more of the transition states, and
wherein a termination state includes a vehicle operation to avoid safety violations; and
    operating a vehicle based on the vehicle action and means for controlling vehicle steering, braking and powertrain.

20. The system of claim 19, further comprising inputting vehicle sensor data by inputting a color video image into the first NN.

* * * * *

UNITED STATES PATENT AND TRADEMARK OFFICE
CERTIFICATE OF CORRECTION

PATENT NO. : 10,733,510 B2
APPLICATION NO. : 16/111550
DATED : August 4, 2020
INVENTOR(S) : Subramanya Nageshrao et al.

It is certified that error appears in the above-identified patent and that said Letters Patent is hereby corrected as shown below:

In the Claims

Column 17, in Lines 18-20, replace "safety violations; and and operate a vehicle" with — safety violations; and operate a vehicle —.

Signed and Sealed this
Seventeenth Day of November, 2020

Andrei Iancu
*Director of the United States Patent and Trademark Office*